United States Patent
Park et al.

(10) Patent No.: US 9,091,591 B2
(45) Date of Patent: Jul. 28, 2015

(54) INFRARED THERMAL DETECTOR AND METHOD OF MANUFACTURING THE SAME

(71) Applicant: Samsung Electronics Co., Ltd., Suwon-Si, Gyeonggi-Do (KR)

(72) Inventors: Hae-seok Park, Yongin-si (KR); Sung-hyun Nam, Yongin-si (KR); Chang-gyun Shin, Anyang-si (KR); Jung-woo Kim, Hwaseong-si (KR)

(73) Assignee: SAMSUNG ELECTRONICS, CO., LTD., Gyeonggi-Do (KR)

( * ) Notice: Subject to any disclaimer, the term of this patent is extended or adjusted under 35 U.S.C. 154(b) by 254 days.

(21) Appl. No.: 13/648,474

(22) Filed: Oct. 10, 2012

(65) Prior Publication Data

US 2013/0087707 A1    Apr. 11, 2013

(30) Foreign Application Priority Data

Oct. 10, 2011 (KR) .................. 10-2011-0103049
Jun. 27, 2012 (KR) .................. 10-2012-0069477

(51) Int. Cl.
*G01J 5/02* (2006.01)
*G01J 5/20* (2006.01)
*G01J 5/08* (2006.01)
*B82Y 20/00* (2011.01)

(52) U.S. Cl.
CPC ............... *G01J 5/023* (2013.01); *B82Y 20/00* (2013.01); *G01J 5/024* (2013.01); *G01J 5/0853* (2013.01); *G01J 5/20* (2013.01)

(58) Field of Classification Search
CPC ......... G01J 5/023; G01J 5/024; G01J 5/0853; G01J 5/20

USPC .................. 250/339.01, 338.1, 352
See application file for complete search history.

(56) References Cited

U.S. PATENT DOCUMENTS

| | | | |
|---|---|---|---|
| 5,760,398 A | 6/1998 | Blackwell et al. | |
| 5,841,137 A * | 11/1998 | Whitney | ............. 250/338.5 |
| 6,621,083 B2 | 9/2003 | Cole | |
| 7,869,045 B1 | 1/2011 | Utsunomiya | |
| 2010/0128275 A1 | 5/2010 | Chau et al. | |
| 2010/0133536 A1 * | 6/2010 | Syllaios et al. | ............. 257/53 |

(Continued)

FOREIGN PATENT DOCUMENTS

| | | |
|---|---|---|
| JP | 2009019893 A | 1/2009 |
| KR | 20110039170 A | 4/2011 |

(Continued)

OTHER PUBLICATIONS

T. Maier et al. "Multispectral microbolometers for the midinfrared"; Optics Letters, vol. 35, p. 3766-3768; 2010.

(Continued)

*Primary Examiner* — David Porta
*Assistant Examiner* — Yara B Green
(74) *Attorney, Agent, or Firm* — Harness, Dickey & Pierce, P.L.C.

(57) ABSTRACT

According to example embodiments, an infrared thermal detector includes a substrate, a detector spaced apart from the substrate, and a thermal legal configured to transmit a signal from the detector to the substrate. The detector is configured to absorb incident infrared light via localized surface Plasmon resonance, and the detector is configured to change a resistance value according to a temperature change caused by the absorbed infrared light.

23 Claims, 11 Drawing Sheets

(56) References Cited

U.S. PATENT DOCUMENTS

2011/0001975 A1    1/2011    Razansky et al.
2011/0204231 A1    8/2011    Razansky et al.
2011/0266444 A1*  11/2011  Hanson ..................... 250/338.4

FOREIGN PATENT DOCUMENTS

KR           101093203 B1    12/2011
WO          WO-97/21250 A1    6/1997
WO          WO-2008/018082 A2  2/2008
WO          WO-2013/010933 A1  1/2013

OTHER PUBLICATIONS

European Search Report dated May 9, 2014 for corresponding European application No. 12 187 837.5.

* cited by examiner

INFRARED THERMAL DETECTOR AND METHOD OF MANUFACTURING THE SAME

CROSS-REFERENCE TO RELATED APPLICATIONS

This application claims priority under 35 U.S.C. §119 to Korean Patent Application No. 10-2011-0103049, filed on Oct. 10, 2011, and Korean Patent Application No. 10-2012-0069477, filed on Jun. 27, 2012, in the Korean Intellectual Property Office, the disclosures of which are incorporated herein in their entirety by reference.

BACKGROUND

1. Field

Example embodiments relate to infrared thermal detectors and/or methods of manufacturing the same, and more particularly, to an infrared thermal detector for receiving and detecting infrared light emitted from an object having a temperature, and a method of manufacturing the same.

2. Description of the Related Art

Some devices may be used to sense radiation. For example, an object having a desired (and/or predetermined) temperature T may emit light according to black body radiation and may have wide band indicating a maximum value. Light emitted from a nearby object at room temperature may be infrared radiation showing a maximum value in a wavelength band of about 10 µm. When such infrared light is incident on a thermal mass connected to surroundings via a thermal leg, a temperature may increase in the thermal mass and the thermal leg. Due to the temperature change caused by the incident infrared light, a resistance change, a polarity change, an electromotive force change, and/or a flexural change may be generated according to characteristics of a material, and such a change may be turned into an image array to obtain a thermal image. For example, a bolometer may be used to realize a thermal image by using a resistance change of a material.

Factors that affect the amount of temperature change of a pixel are the amount of incident energy, which is proportional to a result of multiplying an average light absorption ratio of the pixel by a pixel area in a given wavelength band, the thermal mass of the pixel, and the thermal conductance of the pixel.

An array having a format equal to or above a video graphics array (VGA) level is being developed via pixel miniaturization so as to realize a thermal camera having high resolution and high temperature precision. However, during the pixel miniaturization, the amount of incident energy decreases due to the decreased pixel area, and the amount of temperature change decreases due to the increased thermal conductance caused by a decreased length of a thermal leg. Accordingly, a temperature noise factor may increase as a pixel size decreases, and thus, a pixel having a size larger than a diffraction limit of a used wavelength (up to 10 µm) may be used.

SUMMARY

Example embodiments relate to infrared thermal detectors having subminiaturization and high sensitivity characteristics by obtaining a small thermal mass and small thermal conductance under the same amount of incident energy, and/or by focusing light on a small area via a structure where a localized surface Plasmon resonance phenomenon may be generated, and/or methods of manufacturing the infrared thermal detectors.

Additional aspects will be set forth in part in the description that follows and, in part, will be apparent from the description, or may be learned by practice of example embodiments.

According to example embodiments, an infrared thermal detector includes a substrate, a detector spaced apart from the substrate, and a thermal leg configured to transmit a signal from the detector to the substrate. The detector is configured to absorb incident infrared light via localized surface Plasmon resonance. The detector is configured to change a resistance value according to a temperature changed caused by the absorbed infrared light.

In example embodiments, the detector may include: a metal layer having a pattern that is configured to absorb incident infrared light via localized surface Plasmon resonance; and a thermistor material layer containing a material of which a resistance value changes due to change in temperature at a bottom of the metal layer. The temperature at the bottom of the metal layer may change due to the infrared light absorbed by the detector.

In example embodiments, the detector may be patterned to include a disc shape, a ring shape, a bar shape, or a shape that is combined with a bar shape.

In example embodiments, the thermal leg may be integrally formed with the thermistor material layer because a material of the thermal leg may be the same as the material of the thermistor material layer. In example embodiments, the material of the thermal leg may be different than the material of the thermistor material layer and the thermal leg may be integrally formed with the thermistor material layer because the thermal leg may be stacked on the thermistor material layer.

In example embodiments, the thermistor material layer may be patterned to have a structure that corresponds to the pattern of the metal layer.

In example embodiments, the thermistor material layer may have a flat plate shape.

In example embodiments, the material of the thermistor material layer may include at least one of amorphous silicon, vanadium oxide, and nickel oxide. A resistance value of the thermistor material layer may be configured to change according to changes in temperature.

In example embodiments, the metal layer may include at least one of gold, aluminum, copper, and titanium.

In example embodiments, the detector may further include a dielectric layer between the metal layer and the thermistor material layer.

In example embodiments, the thermal leg may be connected to the detector, and the thermal leg may contain a material capable of an electric connection.

In example embodiments, the thermal leg may include a plurality of semi-rings having different distances from a center, and a plurality of first connectors connecting the plurality of semi-rings. The thermal legal may include a pair of structures. Each one of the pair of structures may include at least one of the plurality of first connectors connecting at least two of the plurality of semi-rings, and the pair of structures may face each other across the detector.

In example embodiments, there may be an air space between the substrate and the detector.

In example embodiments, there may be a material layer between the substrate and the detector. The material layer may be configured to reduce thermal conduction between the substrate and the detector.

In example embodiments, the infrared thermal detector may further include a metal reflection layer on the substrate. The metal reflection layer may be below at least one of the detector and the thermal leg. The metal reflection layer may be configured to reduce light penetration through the substrate.

According to example embodiments, a method of manufacturing an infrared thermal detector includes: forming a metal wire on a substrate; forming a sacrificial layer on the substrate, the sacrificial layer defining two openings that expose two portions of the metal wire on the substrate; forming a thermal leg that is spaced apart from the substrate, the thermal legal including two ends and only the two ends of the thermal leg are electrically connected to the metal wire through the two openings of the sacrificial layer; and forming a detector that is electrically connected to the thermal leg and is spaced apart from the substrate, the detector being configured to absorb incident infrared light via localized surface Plasmon resonance and the detector being configured to change a resistance value according to a temperature change caused by the absorbed infrared light.

In example embodiments, the forming the detector may include forming the detector to have one of a disc shape, a ring shape, a bar shape, and a shape that is combined with the bar shape.

In example embodiments, the thermistor material layer may be integrally formed with the thermal leg while forming the thermal leg, by using the same material as the thermal leg.

In example embodiments, the method may further include patterning the thermistor material layer to correspond to the pattern of the metal layer.

In example embodiments, the method may further include forming an air space between the substrate and the thermal leg by removing the sacrificial layer.

In example embodiments, the sacrificial layer may be formed of a material that reduces thermal conduction so as to reduce thermal conduction between the thermal leg and the substrate.

In example embodiments, the method may further include forming a metal reflection layer that reduces light penetration on the substrate below the detector or thermal leg. In example embodiments, the sacrificial layer may be formed after forming the metal reflection layer.

In example embodiments, the thermistor material layer may have a flat plate structure.

In example embodiments, the thermistor material layer may include at least one of amorphous silicon, vanadium oxide, and nickel oxide.

In example embodiments, the metal layer may include at least one of gold, aluminum, copper, titanium platinum, and silver.

In example embodiments, the method may further include forming an air space between the substrate and the thermal leg by removing the sacrificial layer.

In example embodiments, a material of the sacrificial layer may be configured to reduce thermal conduction between the thermal leg and the substrate.

In example embodiments, the metal reflection layer may be on the substrate before the sacrificial layer is formed, the metal reflection layer may be below at least one of the detector and the thermal leg, and the metal reflection layer may be configured to reduce light penetration through the substrate.

In example embodiments, the metal reflection layer may be formed simultaneously when the metal wire is formed.

According to example embodiments, an infrared thermal detector may include: a substrate; a detector spaced apart from the substrate; and at least one thermal leg that is configured to transmit a signal from the detector to the substrate. The detector may include a metal pattern on a thermistor material layer. The metal pattern may have a width that is less than or equal to about $\lambda/2$ with respect to a wavelength $\lambda$ of infrared light. The thermistor material layer may include a thermistor material. The detector may be configured to absorb incident infrared light via localized surface Plasmon resonance.

In example embodiments, the metal pattern may be one of a ring shape, a disc shape, a bar shape, a rectangular shape, and a shape that is combined with a bar shape.

In example embodiments, the thermistor material may include one of amorphous silicon, vanadium oxide, and nickel oxide, and the metal layer may include at least one of gold, aluminum, copper and titanium.

In example embodiments, the metal pattern is one of a bar shape, a quadrilateral shape defining at least one opening, a particle pattern, and an arrangement including polygons spaced apart.

In example embodiments, the thermal leg may include a pair of structure facing each other across the detector. Each one of the pair of structures may include at least one of the plurality of first connectors connecting two of the plurality of semi-rings.

In example embodiments, a filter may be on the detector. The filter may be configured to at least one of selectively pass incident infrared light and reduce the transmission (and/or block) of non-infrared light.

In example embodiments, the detector and the substrate may define an air space between the substrate and the detector.

In example embodiments, a pixel size of the infrared thermal detector may be less than or equal to about 10 μm.

In example embodiments, the infrared detector may include a dielectric layer between the metal pattern and the thermistor material layer.

According to example embodiments, an infrared thermal detector may include: a substrate; at least one wire on the substrate; a thermistor material layer spaced apart from the substrate; a metal pattern on the thermistor material layer; and at least one thermal leg that is configured to transmit a signal from the detector to the substrate. The thermistor material layer may include a thermistor material. The metal pattern may have a structure that is less than or equal to about $\lambda/2$ with respect to a wavelength $\lambda$ of infrared light. The metal pattern may be configured to absorb incident infrared light via localized surface Plasmon resonance.

BRIEF DESCRIPTION OF THE DRAWINGS

The foregoing and other features and advantages of example embodiments will be apparent from the more particular description of non-limiting embodiments, as illustrated in the accompanying drawings in which like reference characters refer to the same parts throughout the different views. The drawings are not necessarily to scale, emphasis instead being placed upon illustrating the principles of example embodiments. In the drawings.

DETAILED DESCRIPTION

Figure 1:
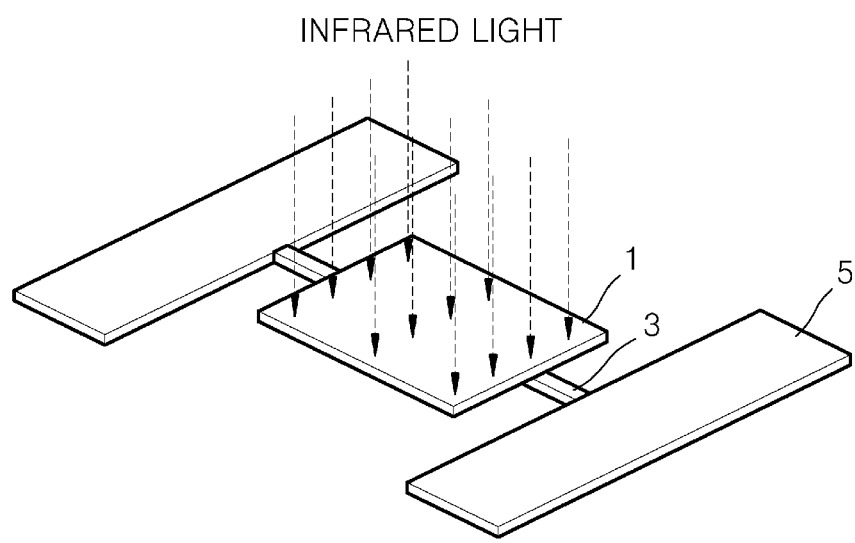
FIG. 1 is a schematic view of an infrared thermal detector.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a schematic view of an infrared thermal detector. When infrared light is incident on the surroundings 5 and a thermal mass 1 (e.g., a detector) connected to a thermal leg 3, a temperature of the thermal mass 1 increases. Such a temperature change ΔT may be represented by Equation 1 below in an equilibrium state.

$$\Delta T = \frac{\varepsilon \Phi_0 A_d}{(G_{th}^2 + \omega^2 C_{th}^2)^{1/2}}$$ [Equation 1]

In Equation 1, $\varepsilon$ denotes a light absorption ratio, $\phi_0$ denotes emission flux of incident infrared light, Ad denotes a detecting area of the thermal mass 1, $G_{th}$ denotes thermal conductance of the thermal leg 3, $\omega$ denotes a frequency of a signal received by a detector, and $C_{th}$ denotes thermal capacity of the thermal mass 1.

Based on Equation 1 above, in order to increase infrared thermal detecting efficiency, the thermal conductance Gth of the thermal leg 3 and the thermal capacity $C_{th}$ of the thermal mass 1 may be decreased, and the emission flux $\phi_0$ and the detecting area $A_d$ may be increased.

Figure 2:
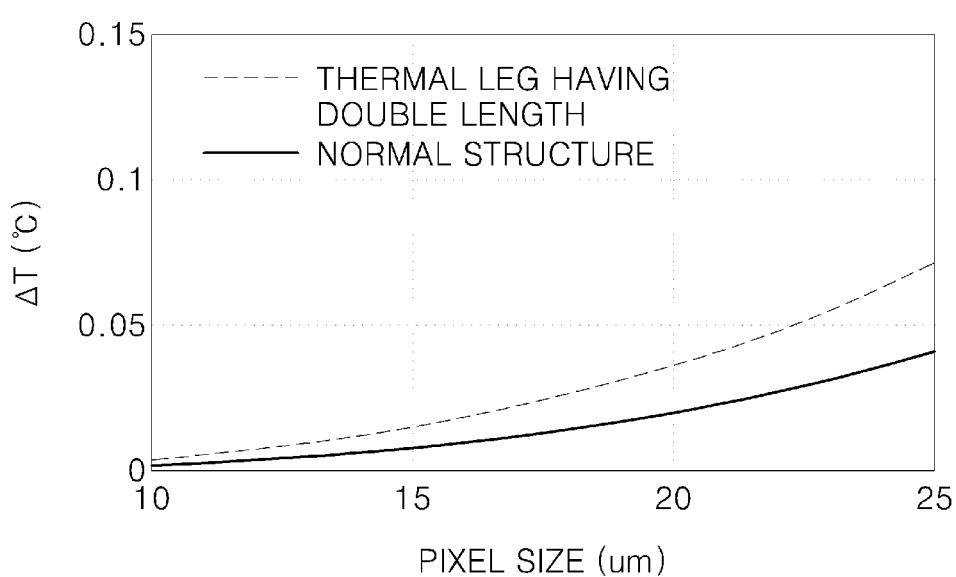
FIG. 2 is a graph showing the differences in temperature changes in a normal structure and in a structure where a length of a thermal leg is doubled.

FIG. 2 is a graph showing the differences in temperature changes ΔT in a normal structure and in a structure where a length of a thermal leg is doubled. In FIG. 2, a horizontal axis denotes a pixel size (μm) and a vertical axis denotes the temperature change ΔT. Here, numerical values in the horizontal and vertical axes of FIG. 2 are not limited to being absolute values. When a length of a thermal leg is doubled for the same pixel size, the temperature change ΔT may increase. Moreover, the temperature change ΔT may increase as the pixel size increases.

However, when a pixel is miniaturized in order to realize a thermal camera having high resolution and high temperature precision, the amount of incident energy may decrease due to a decreased pixel area and the thermal conductance may increase due to a decreased length of a thermal leg. Thus, the amount of temperature change ΔT may decrease as the pixel is miniaturized in a general infrared detector. Accordingly, a temperature noise factor may increase, and thus, a pixel having a size larger than a diffraction limit of about 10 μm in a used wavelength is limited, and a size of a pixel in a general infrared detector may be about 17 μm or more.

According to example embodiments, an infrared thermal detector having subminiaturization and high sensitivity characteristics may be realized by condensing light onto a small area via a structure where a localized surface Plasmon resonance (LSPR) phenomenon is generable.

Devices using an LSPR phenomenon are studied in nano-optics field. A nearly perfect absorption phenomenon using the LSPR phenomenon may be realized by forming a stacked structure of a patterned metal layer, a thermistor material layer, and a patterned metal layer or an even metal layer while adjusting electric coupling with incident light by adjusting the material and shape of used metal, and adjusting magnetic coupling with the incident light by adjusting the type and thickness of a material of the thermistor material layer, thereby suppressing the penetration and reflection of the incident light as much as possible. According to light absorption using the LSPR phenomenon, it is possible to absorb light of a wide area in a small structure since an optical cross-sectional area is large, and a thermal mass may be remarkably reduced since light may be condensed on a very small area when coupling is generated between the incident light and a metal structure via the LSPR phenomenon. For example, the thermal mass may be reduced to about ⅕ or less a general thermal mass. Accordingly, a physical space enough for a long thermal leg may be obtained, and thus, thermal conductance may be also reduced to about ⅕ or less.

By using such an absorption technology using the LSPR phenomenon, the same amount of temperature change may be obtained in a pixel having a size equal to or less than about 50% of a minimum pixel in an existing infrared thermal detector, and about triple the amount of temperature change may be obtained in a pixel having the same size with an existing infrared thermal detector.

Figure 3:
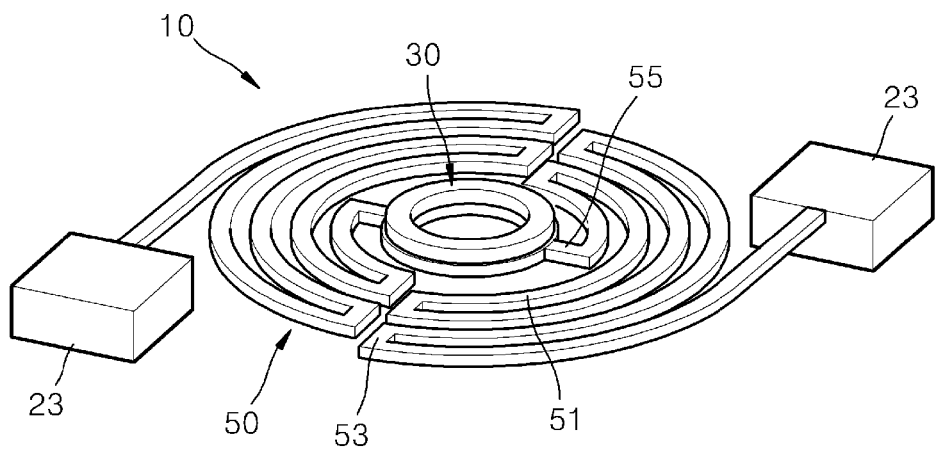
FIG. 3 is a schematic view of an infrared thermal detector using a light absorption technology using localized surface Plasmon resonance, according to example embodiments.
Figure 4:
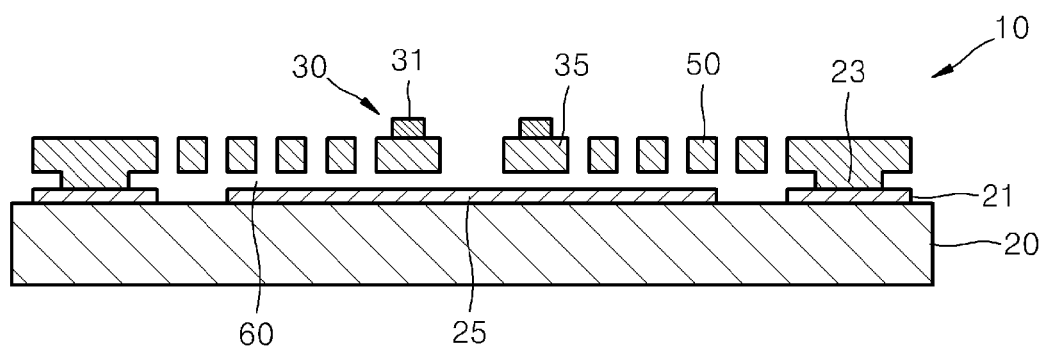
FIG. 4 is a schematic cross-sectional view of an infrared thermal detector according to example embodiments.

FIG. 3 is a schematic view of an infrared thermal detector 10 using a light absorption technology using LSPR, according to example embodiments. FIG. 4 is a schematic cross-sectional view of an infrared thermal detector 10 according to example embodiments. In FIG. 3, a substrate 20 is not illustrated for clarity.

Referring to FIGS. 3 and 4, the infrared thermal detector 10 includes the substrate 20, a detector 30, and a thermal leg 50. The detector 30 is spaced apart from the substrate 20, absorbs an incident infrared light according to LSPR, and changes a resistance value according to a temperature change caused by the absorbed infrared light. The thermal leg 50 transmits a signal obtained via the temperature change from the detector 30 to the substrate 20.

A read-out integrated circuit (IC) (not shown) may be included in the substrate 20. The substrate 20 may contain a semiconductor material. The semiconductor material may be insulated by a dielectric material to protect the readout integrated circuit (IC) (not shown) in the substrate 20. For example, the substrate 20 may be silicon (Si) or silicon (Si) insulated by at least one of silicon oxide and silicon nitride to product a readout integrated circuit (IC) (not shown) in the substrate 20. However, example embodiments are not limited thereto.

A metal wire 21 for electrically connecting the thermal leg 50 and the read-out IC of the substrate 20 may be formed on the substrate 20.

The infrared thermal detector 10 may further include a metal reflection layer 25 that reduces (and/or blocks) light penetration on the substrate 20 below the detector 30 or the thermal legal 50. The metal reflection layer 25 may be formed of a metal such as aluminum (Al), titanium (Ti), platinum (Pt), and/or gold (Au). However, example embodiments are not limited thereto.

Figure 5:
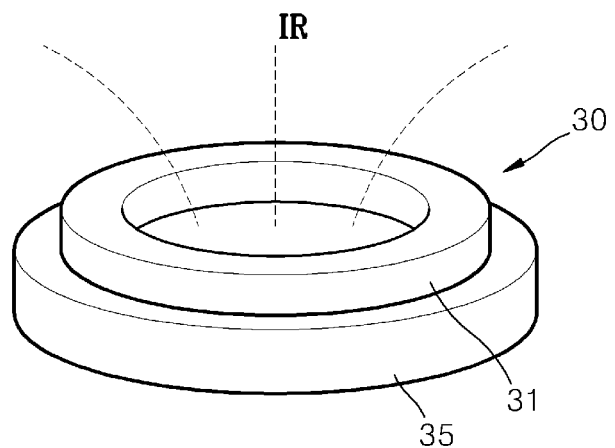
FIG. 5 is an enlarged schematic perspective view of a detector of FIGS. 3 and 4, according to example embodiments.

FIG. 5 is an enlarged schematic perspective view of the detector 30 of FIGS. 3 and 4, according to example embodiments.

Referring to FIGS. 3 through 5, the detector 30 may have a layered structure including a metal layer 31 having a patterned structure to absorb incident infrared light IR via LSPR, and a thermistor material layer 35 prepared below the metal layer 31. The infrared light IR is absorbed as LSPR is generated at a structure including the metal layer 31 by the infrared light IR. The thermistor material layer 35 may be prepared to change a resistance value as a temperature of the detector 30 changes in temperature as the infrared light IR is absorbed via LSPR. In other words, the thermistor material layer 35 may include a material that changes a resistance value in response to a temperature change caused by absorbed infrared light. The metal layer 31 may include at least one material selected from the group consisting of gold, aluminum, copper, titanium, platinum, and silver. The metal layer 31 may have a patterned structure such that the infrared light IR is absorbed as LSPR is generated by the infrared light IR. So as to absorb the infrared light IR by the LSPR, the length or width of a structure of the metal layer 31 where the LSPR is generated may have a size equal to or less than about λ/2 with respect to a wavelength λ of the infrared light IR. Infrared light IR may range from about 750 nm to about 1 mm. Accordingly, a length or width of a metal layer may have a size that is equal to or less than 5 µm if the metal layer is configured to absorb infrared light IR of about 10 µm via LSPR, but example embodiments are not limited thereto.

The thermistor material layer 35 may include a material that may convert a temperature change caused by the absorbed infrared light to a resistance change. In other words, the thermistor material layer 35 may include a thermistor material. For example, the thermistor material layer 35 may include a material of which a resistance value changes according to a temperature change, such as amorphous silicon, vanadium oxide, or nickel oxide. When the thermistor material layer 35 includes the material that changes the temperature change to the resistance change as such, the temperature change obtained by absorbing the infrared light IR incident on the metal layer 31 via LSPR is shown as the resistance change in the thermistor material layer 35. A signal according to the resistance change is transmitted to a read-out IC (not shown) included in the substrate 20 through the thermal leg 50.

Meanwhile, the detector 30 may be patterned to have a disc shape, a ring shape, a bar shape, or a shape that is combined with a bar shape. However, example embodiments of inventive concepts are not limited thereto.

In other words, the metal layer 31 has a patterned structure to absorb the infrared light IR incident via LSPR, and the thermistor material layer 35 may be patterned to a structure corresponding to the metal layer. Here, the thermistor material layer 35 may have the same structure as the metal layer 31, while having the same or different size from the metal layer 31.

The shape of the detector 30 may be adjusted depending on the desired characteristics. For example, in order to make a detector where the dependency on the polarization of light may be reduced, the shape of the metal layer 31 may be patterned to have 4 fold symmetry.

As shown in FIGS. 3 through 5, the detector 30 may have a ring shape. In other words, the metal layer 31 may have a ring shape and the thermistor material layer 35 may also have a corresponding ring shape. In FIGS. 3 through 5, the thermistor material layer 35 has a wider ring shape than the metal layer 31, but alternatively, the thermistor material layer 35 may have the same or smaller ring shape than the metal layer 31.

Figure 6:
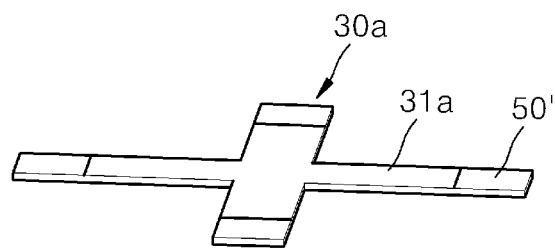
FIG. 6 is an enlarged schematic perspective view of a detector of an infrared thermal detector according to example embodiments.

According to example embodiments, a detector 30 may having a bar shape as shown in FIG. 6, or a structure that is combined with a bar shape. Referring to FIG. 6, the detector 30*a* having a bar shape may include a metal layer 31*a* and thermal legs 50' including the same materials as the metal layer 31 and thermal leg 50 respectively in FIGS. 3-4, but the shape of the metal layer 31*a* and thermal legs 50' may form a detector 30*a* having a bar shape according to example embodiments.

Figure 14:
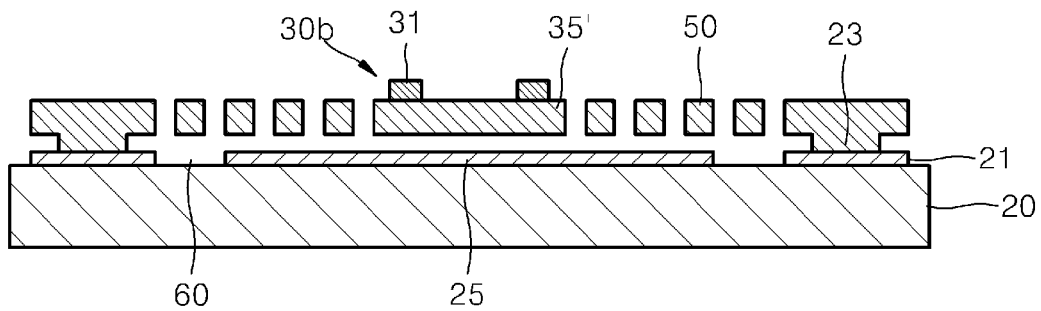
FIGS. 14 and 15 are cross-sectional views schematically showing infrared thermal detectors according to example embodiments.

The detector 30 may have a disc shape. Alternatively, in the detector 30, the metal layer 31 may have a ring shape, a bar shape, or a shape that is combined with a bar shape, and the thermistor material layer 35 may have a flat plate shape, such as a disc shape. In FIG. 14, the metal layer 31 of a detector 30*b* according to example embodiments has a ring shape and the thermistor material layer 35' of the detector 30*b* has a flat plate shape, such as a disc shape.

Figure 15:
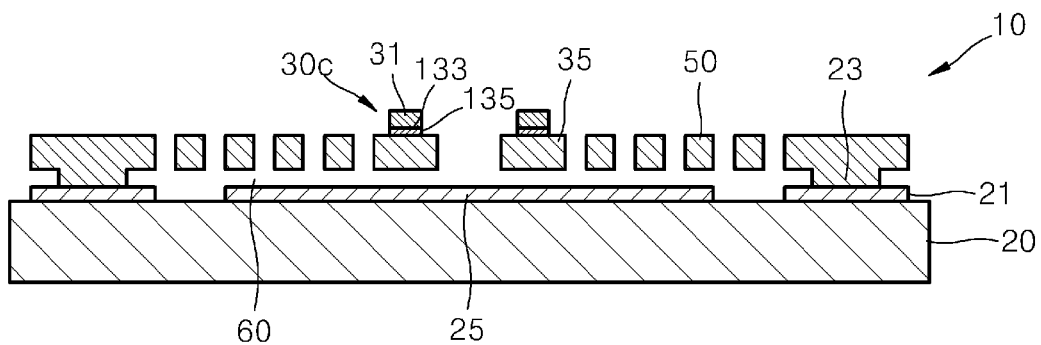

According to example embodiments, a detector 30 may further include a dielectric layer 135 as shown in FIG. 15, between the metal layer 31 and the thermistor material layer 35. As shown in FIG. 15, when the dielectric layer 135 is further included, absorption is also generated by surface Plasmon resonance at an interface 133 between the metal layer 31 and the dielectric layer 135. FIG. 15 shows an example of the detector 30, which further includes the dielectric layer 135, having a ring shape. Even when the detector 30 further includes the dielectric layer 135, the detector 30 may have various shapes as described above. The dielectric layer 135 may have a thickness of about 50 Å to about 2000 Å.

The thermal leg 50 may be formed to transmit, from the detector 30 to the read-out IC of the substrate 20, the signal according to the resistance change, and at the same time, sufficiently and quickly remove heat of the detector 30 without transmitting the heat of the detector 30 to the substrate 20 through the thermal leg 50. As shown in FIGS. 3 and 4, the thermal leg 50 may be patterned such that the length of the thermal leg 50 is increased as much as possible in a desired (and/or predetermined) area.

As shown in FIG. 3, the thermal leg 50 may have a structure including a plurality of semi-rings 51 having different distances from a center (e.g., radial distances), and a first connector 53 connecting the semi-rings 51 so as to have a highest length within a desired (and/or predetermined) area, wherein a pair of structures each including the semi-rings 51 and the first connector 53 may be disposed to face each other across the detector 30. The thermistor material layer 35 of the detector 30 and the innermost semi-ring 51 of the thermal leg 50 may be electrically connected to each other via a second connector 55. The thermal leg 50 may be formed to include the first and second connectors 53 and 55, and the semi-rings 51 via patterning. The outermost semi-ring 51 may be patterned to a structure that extends to be electrically connected to a post 23.

A region where the two ends of the thermal leg 50 and the metal wire 21 formed on the substrate 20 are electrically connected may be the post 23 so as to support the thermal leg 50 separately from the substrate 20. The post 23 may be formed while forming the thermal leg 50 by using the same material as the thermal leg 50. Alternatively, the post 23 may be formed of a different material than that of the thermal leg 50.

Meanwhile, the thermal leg 50 may be integrally formed of the same material as the thermistor material layer 35. In other words, the thermal leg 50 and the thermistor material layer 35 may be formed of the same material during a same manufacturing processing step.

Alternatively, the thermal leg 50 may be individually formed from the detector 30 by using a material capable of electric connection. In other words, as described subsequently in FIG. 22, a thermal leg 50' may be formed to be electrically connected to the thermistor material layer 35 by using a material different from the thermistor material layer 35 during a different manufacturing processing step. For example, the thermal leg 50 may be stacked on the thermistor material layer 35.

The infrared thermal detector 10 according to example embodiments may include a 2-dimensional (2D) array including the detector 30 and the thermal leg 50 described above, and may be realized as an infrared thermal detector having a 2D pixel array, such as an infrared thermal camera.

Since it is possible to decrease the size of the detector 30 in the infrared thermal detector 10 of according to example embodiments, an area occupied by the thermal leg 50 in a pixel area having a desired (and/or predetermined) size may be increased compared to that of a general infrared thermal detector, and thus, the length of a thermal leg 50 may be increased.

Accordingly, since the detector 30 absorbs the infrared light IR incident on the structure including the metal layer 31 according to the LSPR, the size of the detector 30 may at least several times smaller than the wavelength of the infrared light IR, and thus, it is possible to increase the length of the thermal leg 50 while decreasing a pixel size. As such, by decreasing the size of the detector 30, the thermal mass may be decreased, and by increasing the length of the thermal leg 50, the thermal conductance may be decreased. Accordingly, the infrared thermal detector 10 having subminiaturization and high sensitivity characteristics may be realized by obtaining a small thermal mass and small thermal conductance under the same amount of incident energy. Here, the pixel size may be remarkably decreased compared to a general infrared thermal detector.

The infrared thermal detector 10 according to example embodiments may include, as shown in FIG. 4, an air space 60 between the substrate 20 and the detector 30 so as to reduce (and/or block) heat generated by the infrared light IR absorbed by the detector 30 from being directly transmitted to the substrate 20.

Figure 7:
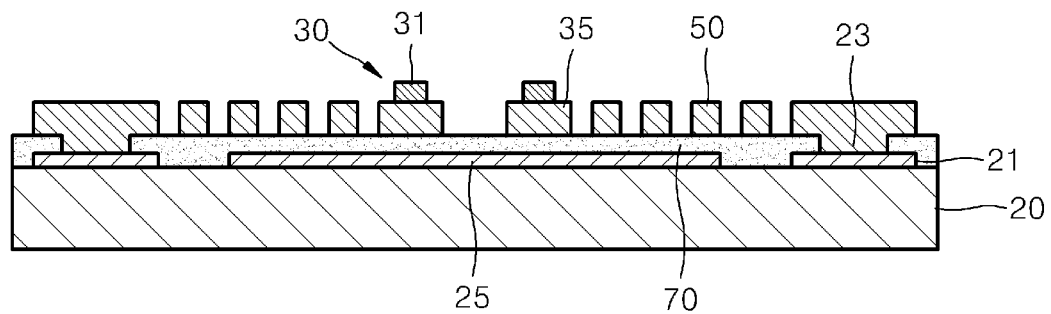
FIG. 7 is a schematic cross-sectional view of an infrared thermal detector according to example embodiments.

Alternatively, the infrared thermal detector 10 according to example embodiments may include a material layer 70 that reduces (and/or blocks) thermal conductance between the substrate 20 and the detector 30, as shown in FIG. 7. The material layer 70 may correspond to a sacrificial layer that will be described below with reference to a method of manufacturing an infrared thermal detector, according to example embodiments. FIG. 4 may correspond to a structure from which a sacrificial layer is removed and FIG. 7 may correspond to a structure including a sacrificial layer.

The infrared thermal detector 10 according to example embodiments may further include a metal reflection layer 25 that reduces (and/or blocks) light penetration on the substrate 20 below the detector 30 or the thermal leg 50. The metal wire 21 for electrically connecting the thermal leg 50 and the read-out IC of the substrate 20 is formed on the substrate 20, and the metal reflection layer 25 may be simultaneously formed of the same material as the metal wire 21 while forming the metal wire 21. Alternatively, the metal reflection layer 25 may be formed of a different material than that of the metal wire 21. The metal reflection layer 25 may be patterned.

FIGS. 8 through 13 are views for describing a method of manufacturing the infrared thermal detector 10 according to example embodiments.

First, the substrate 20 is prepared. Then, the thermal leg 50 that is spaced apart from the substrate 20 and of which only two ends are electrically connected to the substrate 20 is formed on the substrate 20. Also, the detector 30 is formed such that the detector 30 is electrically connected to the thermal leg 50, absorbs the infrared light via LSPR, and has a resistance value that changes according to a temperature change caused by the absorbed infrared light.

Figure 8:
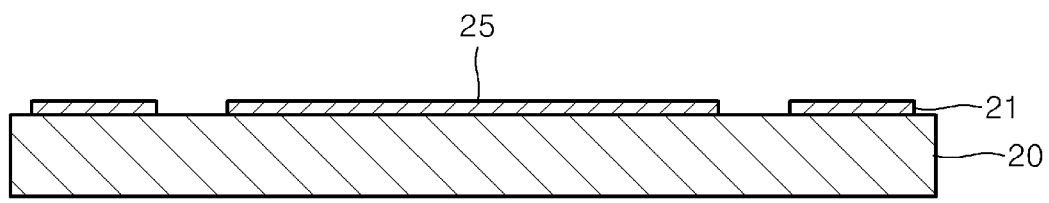
FIGS. 8 through 13 are views for describing a method of manufacturing an infrared thermal detector according to example embodiments.

Referring to FIG. 8, the metal wire 21 for electrically connecting the read-out IC (not shown) of the substrate 20 and the thermal leg 50 may be formed on the substrate 20, and the metal reflection layer 25 may be formed on a region of the substrate 20 corresponding to below the detector 30 or the thermal leg 50. The metal wire 21 and the metal reflection layer 25 may be formed of the same or a different material. The metal reflection layer 25 may be formed on the substrate 20 corresponding to below the detector 30 or the thermal leg 50 such that light does not penetrate therethrough. The metal reflection layer 25 may have a flat structure or a patterned structure. The metal reflection layer 25 may be simultaneously formed with the metal wire 21.

Figure 9:
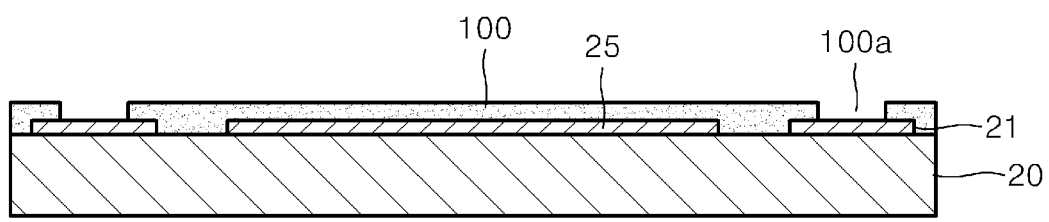

In order to form the thermal leg 50 spaced apart from the substrate 20 and having only two ends that are electrically connected to the metal wire 21 on the substrate 20, a sacrificial layer 100 having an opening 100a in a connection portion of the metal wire 21 and the thermal leg 50 may be formed on the substrate 20, as shown in FIG. 9. The sacrificial layer 100 may be formed of polysilicon, amorphous silicon (a-Si), polymer, or silicon oxide, but example embodiments are not limited thereto.

When the metal reflection layer 25 is formed, the sacrificial layer 100 is formed after forming the metal reflection layer 25. The sacrificial layer 100 may be removed after forming the detector 30 so that the air space 60 is between the substrate 20 and the thermal leg 50. Alternatively, the sacrificial layer 100 may be formed of a material that reduces (and/or blocks) thermal conduction so as to be used as the material layer 70 of FIG. 7, which reduces (and/or blocks) thermal conduction between the thermal leg 50 and the substrate 20. Here, as an example, the case that the sacrificial layer 100 is removed, is described.

Figure 10:
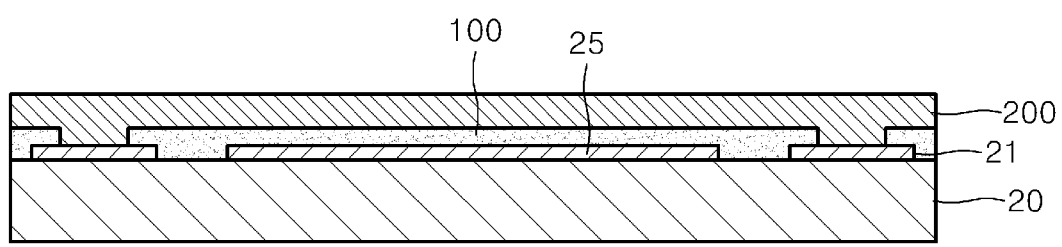

Next, as shown in FIG. 10, a layer 200 capable of electric connection, (e.g., a layer for forming the thermal leg 50) is formed on the opening 100a and the sacrificial layer 100. Layer 200 may include amorphous silicon (a-Si), nickel oxide (NiOx), vanadium oxide (VOx), or GaSbTe (GST), but example embodiments are not limited thereto. Layer 200 may alternatively be a multilayer of a-Si, NiOx, or VOx.

Figure 11:
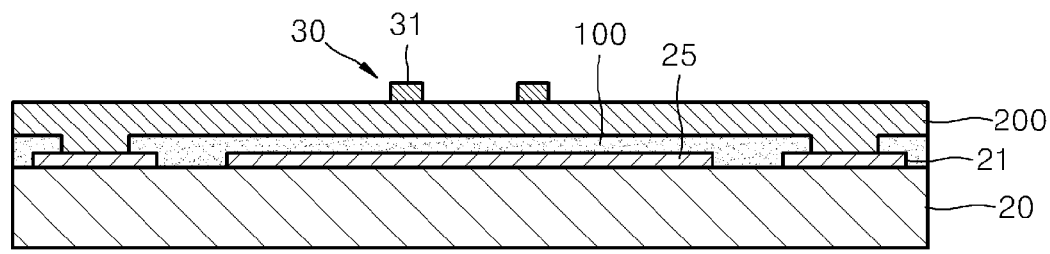
Figure 12:
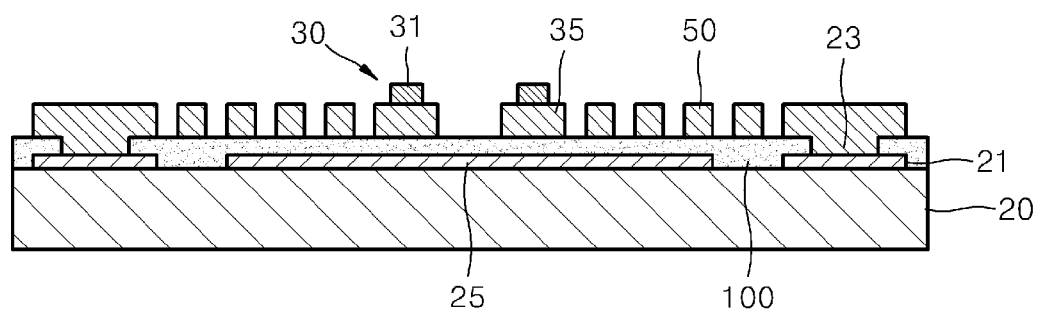

Then, as shown in FIGS. 11 and 12, the layer 200 is patterned to form the thermal leg 50 of which only two ends are electrically connected to the metal wire 21 and other regions are spaced apart from the substrate 20.

In FIGS. 11 and 12, the thermistor material layer 35 is integrally formed with the thermal leg 50 during the same process of forming the thermal leg 50 by using the same material as the thermal leg 50. Also, in FIGS. 11 and 12, the patterned metal layer 31 of the detector 30 is first formed on the layer 200, and the thermal material layer 35 below the metal layer 31 and the thermal leg 50 are integrally formed with respect to the detector 30 by using the same material. Alternatively, the thermistor material layer 35 and the thermal leg 50 may be first patterned and formed, and the metal layer 31 may be formed on a suitable location of the thermistor material layer 35. The detector 30 includes the metal layer 31 and the thermistor material layer 35, wherein the metal layer 31 may have a patterned structure to absorb infrared light via LSPR.

The metal layer 31 may include at least one material selected from the group consisting of gold, aluminum, copper, titanium, platinum, and silver. The thermistor material layer 35 may be formed of a material that changes a temperature change due to the absorbed infrared light to a resistance change. For example, the thermistor material layer 35 may include at least one material of which a resistance value changes according to a temperature change, such as amorphous silicon, vanadium oxide, or nickel oxide. The material of the thermistor material layer 35 is capable of electric connection, and is also used to form the thermal leg 50. Accordingly, the material may be used to integrally form the thermistor material layer 35 and the thermal leg 50 during the same process. The thermistor material layer 35 may be patterned to a structure corresponding to the metal layer 31. Alternatively, a thermistor material layer 35' may have a flat plate shape as shown in FIG. 14.

As shown in FIGS. 11-12, the detector 30 has a ring shape. Alternatively, as described above, the detector 30 may have a disk shape, a ring shape, a bar shape, or a shape that is combines with a bar shape. However, example embodiments are not limited thereto.

A portion of the layer 200 filing the opening 100a of the sacrificial layer 100 corresponds to the post 23 described above. The post 23 also includes a thickness portion formed at the same height as the thermal leg 50 upward.

Figure 13:
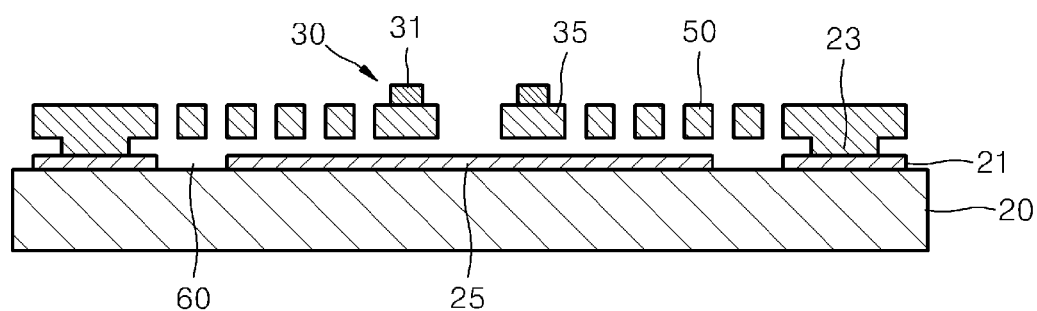

Then, as shown in FIG. 13, the sacrificial layer 100 may be removed to form the air space 60 between the substrate 20 and the thermal leg 50. As described above, when the sacrificial layer 100 is formed of a material that reduces (and/or blocks) thermal conduction, the sacrificial layer 100 may not be removed to realize the infrared thermal detector 10 having the material layer 70 that reduces (and/or blocks) thermal conduction, as shown in FIG. 7.

Figure 16:
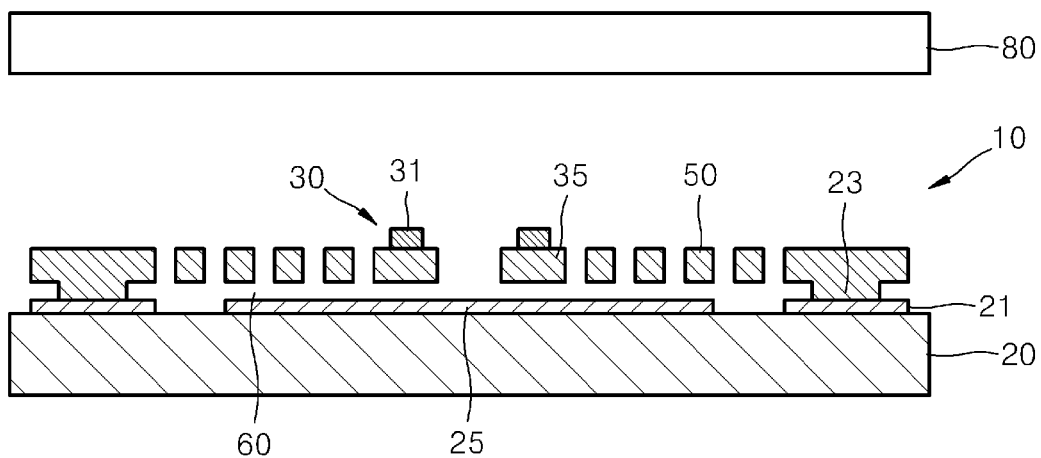
FIG. 16 is a schematic cross-sectional view of an infrared thermal detector according to example embodiments.

FIG. 16 is a schematic cross-sectional view of an infrared thermal detector 10 according to example embodiments. As shown in FIG. 16, an infrared thermal detector 10 according to example embodiments may be the same as the infrared thermal detector 10 shown in FIG. 4, and further include a filter 80 for selectively passing infrared radiation and/or reducing (and/or blocking) the transmission of non-infrared radiation. Infrared thermal detectors according to example embodiments described above with reference to FIGS. 3, 5, 6, and 7 and subsequently with reference to FIGS. 17, 18, 19A, 19B, 20A, 20B, 21A, 21B, and 22 may also include a filter 80.

Figure 17:
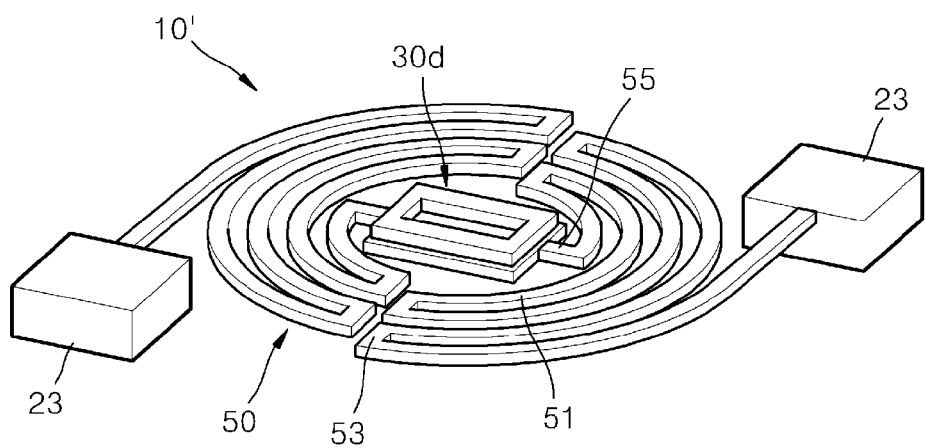
FIG. 17 is a schematic view of an infrared thermal detector using a light absorption technology using localized surface Plasmon resonance, according to example embodiments.
Figure 18:
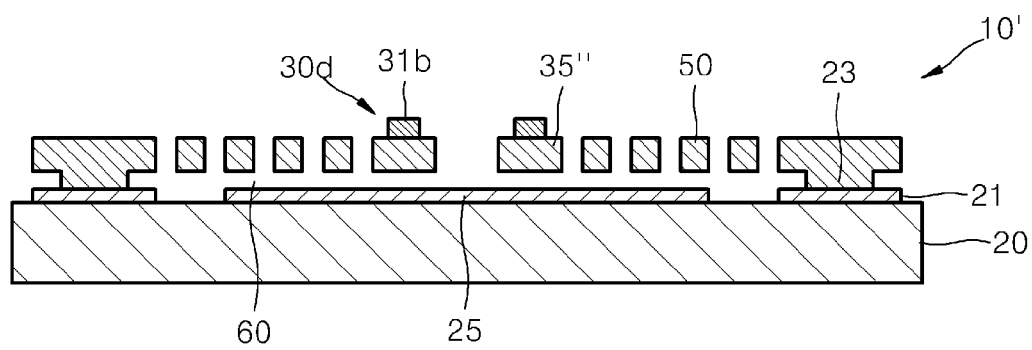
FIG. 18 is a schematic cross-sectional view of an infrared thermal detector according to example embodiments.

FIG. 17 is a schematic view of an infrared thermal detector 10' using a light absorption technology using LSPR, according to example embodiments. FIG. 18 is a schematic cross-sectional view of an infrared thermal detector 10' according to example embodiments. In FIG. 17, a substrate 20 is not illustrated for clarity. In order to avoid duplication, the discussion of features in the infrared thermal detector 10' shown in FIGS. 17-18 that are the same as the features in the infrared detector 10 in FIGS. 3-4 are omitted. Only the differences are discussed.

Referring to FIGS. 17-18, the infrared thermal detector 10' includes a detector 30d having a layered structure. The detector 30d includes a metal layer 31b that includes a patterned structure to absorb incident infrared light IR via LSPR and a thermistor material layer 35'' below the metal layer 31b. The metal layer 31b in FIG. 18 may include the same materials as the metal layer 31 described with reference to FIG. 4. However, the metal layer 31b in FIG. 18 may be patterned to have a rectangular shape such as a square shape or a rectangle pattern including 2 sides having lengths that are longer than an other 2 sides. The metal layer 31b may define an opening. The infrared thermal detector 10' may further include the metal reflection layer 25 on the substrate 20 below the metal layer 31b. The thermistor material layer 35'' may include a shape (e.g., rectangular shape) that corresponds with a shape of the metal layer 31b.

Although not shown, the infrared thermal detector 10' in FIGS. 17-18 may further include a dielectric layer 135 between the metal layer 31b and the thermistor material layer 35'', similar to a thermal detector according to example embodiments described previously with respect to FIG. 15.

Additionally, although not shown, the infrared thermal detector 10' in FIGS. 17-18 may further include a material layer 70 between the metal layer 31b and the thermistor material layer 35'', similar to a thermal detector according to example embodiments described previously with respect to FIG. 7.

Figure 21A:
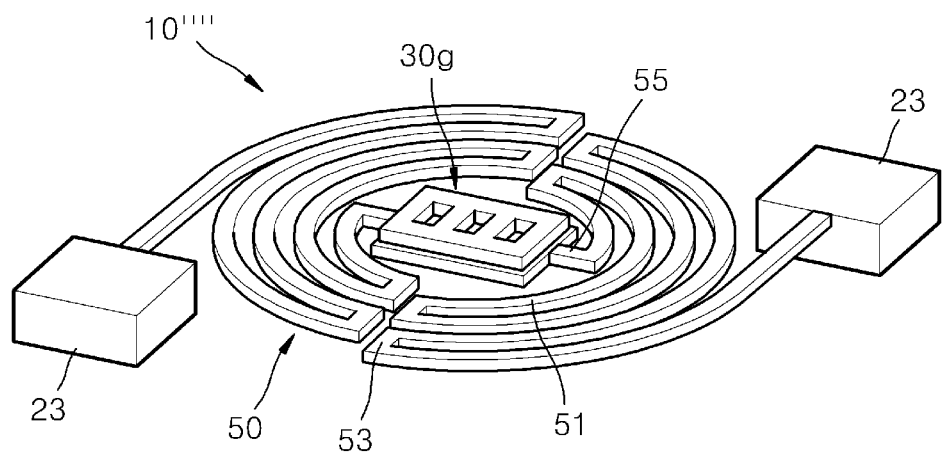
FIGS. 21A and 21B are a schematic view and a schematic cross-sectional view of an infrared thermal detector according to example embodiments.
Figure 21B:
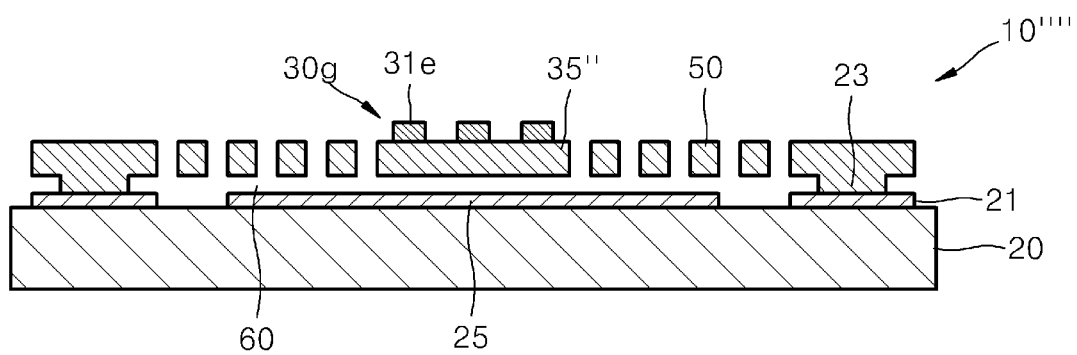

While FIGS. 17-18 illustrate a metal layer 31b that is patterned to have a rectangular shape that defines one opening, example embodiments are not limited thereto. For example, as shown in FIGS. 21A and 21B, an infrared thermal detector 10'''' according to example embodiments may be the same as the infrared thermal detector 10' in FIGS. 17-18, except the infrared thermal detector 10'''' may include a metal layer 31e that has a rectangular shape and defines two openings.

Figure 19A:
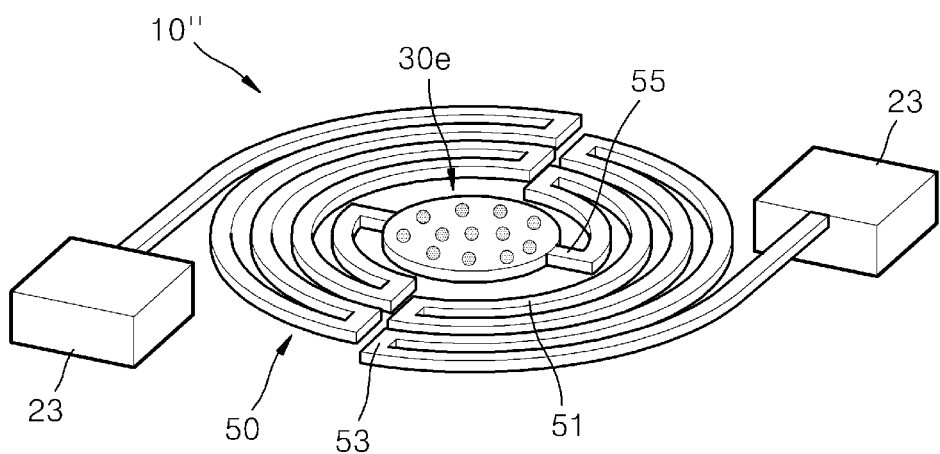
FIGS. 19A and 19B are a schematic view and a schematic cross-sectional view of an infrared thermal detector according to example embodiments.
Figure 19B:
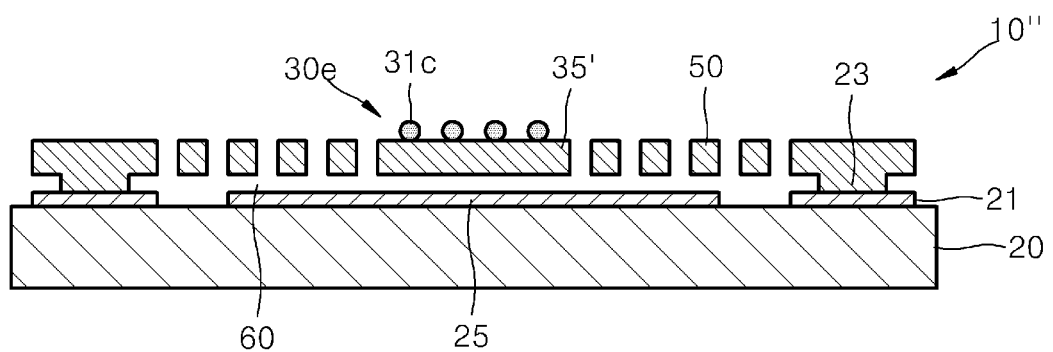

FIGS. 19A to 19B are a schematic view and a schematic cross-sectional view of an infrared thermal detector according to example embodiments.

Referring to FIGS. 19A to 19B, an infrared thermal detector 10'' according to example embodiments is the same as the infrared thermal detector illustrated in FIG. 14 except for the pattern of the metal layer. As shown in FIGS. 19A to 19B, the detector 30e may include a metal layer 31c having a particle pattern. The particles of the metal layer 31c may be nanoparticles or microparticles arranged in a pattern that is configured to absorb infrared radiation via LSPR. The materials of the metal layer 31c in FIGS. 19A to 19B may be the same as the materials of the metal layer 31 described previously with respect to FIGS. 3-4.

Figure 20A:
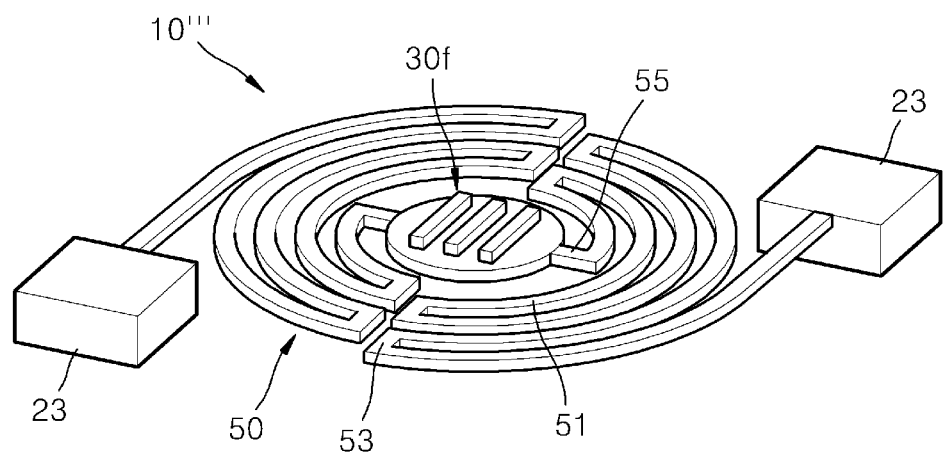
FIGS. 20A and 20B are a schematic view and a schematic cross-sectional view of an infrared thermal detector according to example embodiments.
Figure 20B:
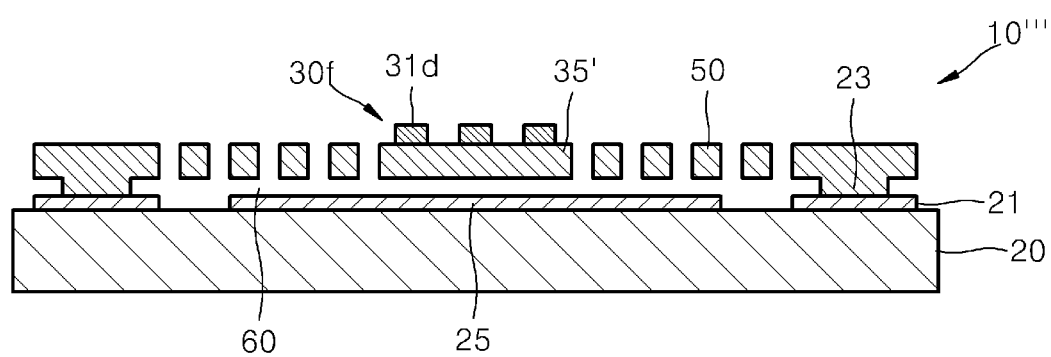

FIGS. 20A and 20B are a schematic view and a schematic cross-sectional view of an infrared thermal detector according to example embodiments.

Referring to FIGS. 20A to 20B, an infrared thermal detector 10''' according to example embodiments is the same as the infrared thermal detector illustrated in FIGS. 19A to 19B except for the metal layer. As shown in FIGS. 20A to 20B, the detector 30f may include a metal layer 31d having a plurality of polygons (e.g., rectangles) that are spaced apart. The polygons of the metal layer 31d may be arranged in a pattern that is configured to absorb infrared radiation via LSPR. The materials of the metal layer 31d in FIGS. 20A to 20B may be the same as the materials of the metal layer 31 described previously with respect to FIGS. 3-4.

FIGS. 21A and 21B are a schematic view and a schematic cross-sectional view of an infrared thermal detector according to example embodiments.

Referring to FIGS. 21A to 21B, an infrared thermal detector 10'''' according to example embodiments is the same as the infrared thermal detector illustrated in FIGS. 19A to 19B except for the metal layer. As shown in FIGS. 21A to 21B, the detector 30g may include a metal layer 31e patterned to have a rectangular shape such as a square shape or a rectangle pattern including 2 sides having lengths that are longer than an other 2 sides. The metal layer 31e may define a plurality of openings. The metal layer 31e may be arranged in a pattern that is configured to absorb infrared radiation via LSPR. The materials of the metal layer 31e in FIGS. 21A to 21B may be the same as the materials of the metal layer 31 described previously with respect to FIGS. 3-4.

Figure 22:
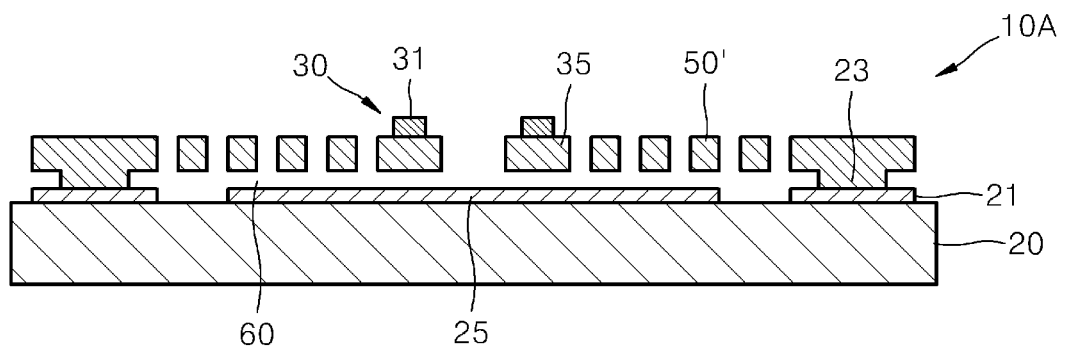
FIG. 22 is a schematic cross-sectional view of an infrared thermal detector according to example embodiments.

FIG. 22 is a schematic cross-sectional view of an infrared thermal detector according to example embodiments.

Referring to FIG. 22, an infrared thermal detector 10A according to example embodiments may be the same as the infrared thermal detector 10 described previously with respect to FIGS. 3-4, except for a material of the thermal legs. According to example embodiments, the thermal leg 50' illustrated in FIG. 22 may include a material that is different than a material of the thermistor material layer 35. The thermal leg 50' may include a material that is capable of forming an electric connection between the detector 30 and the posts 23.

Figure 23:
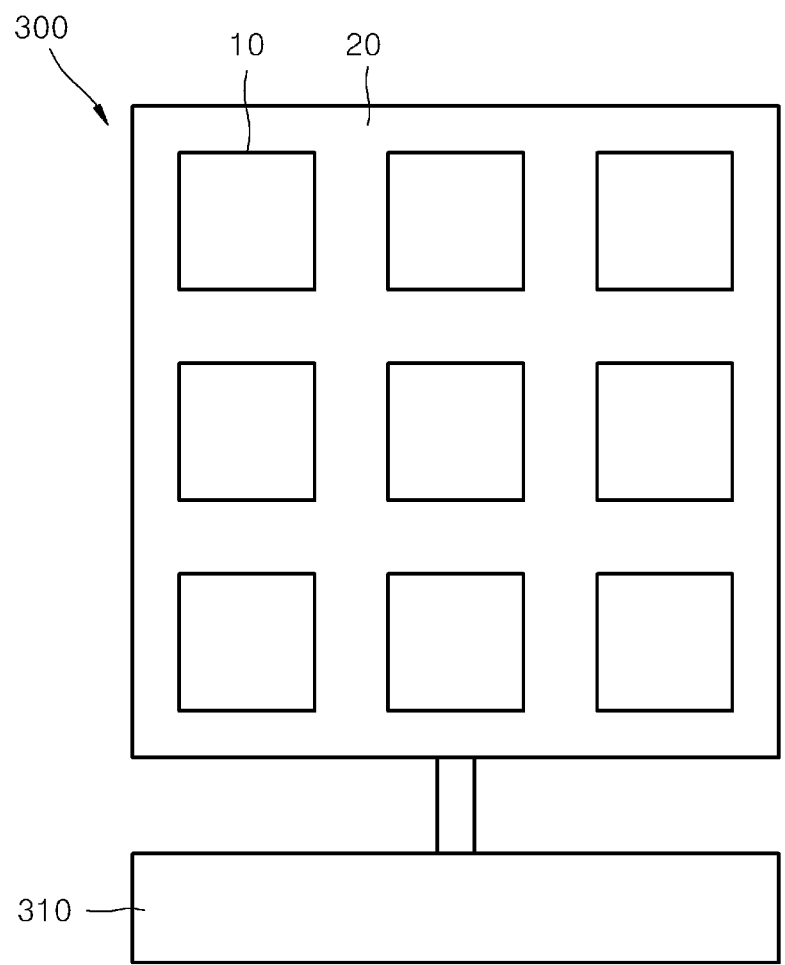
FIG. 23 illustrates an infrared thermal detector chip according to example embodiments.

FIG. 23 illustrates an infrared thermal detector chip according to example embodiments.

Referring to FIG. 23, an infrared thermal detector chip 300 according to example embodiments may include an array of pixels on a substrate 20. Each pixel may correspond to an infrared thermal detector 10 (or 10', 10'', 10''', 10'''') according to example embodiments, as described above. The signals from the infrared thermal detector chip 300 may be output to a processor 310.

According to example embodiments, an infrared thermal detector having subminiaturization and high sensitivity characteristics can be realized by obtaining a small thermal mass and small thermal conductance under the same amount of incident energy by condensing light on a small area via a structure where an LSPR phenomenon is generable.

Descriptions of features or aspects within example embodiments described above should typically be considered as available for other similar features or aspects in other example embodiments. While some example embodiments have been particularly shown and described, it will be understood by one of ordinary skill in the art that variations in form and detail may be made therein without departing from the spirit and scope of the claims.

What is claimed is:

1. An infrared thermal detector comprising:
    a substrate;
    a detector spaced apart from the substrate,
        the detector including a thermistor material layer and,
        a metal layer directly on the thermistor layer, or
        a dielectric layer and the a metal layer stacked directly on the thermistor material layer so the dielectric layer is between the metal layer and the thermistor material layer,
    the metal layer having a pattern that is configured to absorb incident infrared light via localized Plasmon resonance,
    the thermistor material layer being configured to change a resistance value according to a temperature change caused by the absorbed infrared light; and
    a thermal leg configured to transmit a signal from the detector to the substrate.

2. The infrared thermal detector of claim 1, wherein
    the thermistor material layer contains a material of which a resistance value changes due to a change in a temperature at a bottom of the metal layer, wherein the temperature at the bottom of the metal layer changes due to the infrared light absorbed by the detector.

3. The infrared thermal detector of claim 1, wherein the detector is patterned to include one of a disc shape, a ring shape, a bar shape, and a shape that is combined with the bar shape.

4. The infrared thermal detector of claim 1,
    the thermal leg is integrally formed with the thermistor material layer because a material of the thermal leg is the same as the material of the thermistor material layer, or
    the material of the thermal leg is different than the material of the thermistor material layer and the thermal leg is integrally formed with the thermistor material layer because the thermal leg is stacked on the thermistor material layer.

5. The infrared thermal detector of claim 4, wherein
    the thermistor material layer is patterned, and
    the pattern of the thermistor material layer corresponds to the pattern of the metal layer.

6. The infrared thermal detector of claim 4, wherein the thermistor material layer has a flat plate shape.

7. The infrared thermal detector of claim 1, wherein the material of the thermistor material layer includes at least one of amorphous silicon, vanadium oxide, and nickel oxide, and
    a resistance value of the thermistor material layer is configured to change according to changes in temperature.

8. The infrared thermal detector of claim 1, wherein the metal layer includes at least one of gold, aluminum, copper, and titanium.

9. The infrared thermal detector of claim 1, wherein
    the thermal leg is connected to the detector, and
    the thermal legal contains a material capable of an electric connection.

10. The infrared thermal detector of claim 1, wherein the thermal leg includes:
    a plurality of semi-rings having different distances from a center, and
    a plurality of first connectors connecting the plurality of semi-rings.

11. The infrared thermal detector of claim 10, wherein
    the thermal leg includes a pair of structures,
    each one of the pair of structures includes at least one of the plurality of first connectors connecting at least two of the plurality of semi-rings, and
    the pair of structures face each other across the detector.

12. The infrared thermal detector of claim 1, wherein the detector and the substrate define an air space between the substrate and the detector.

13. The infrared thermal detector of claim 1, further comprising:
    a material layer between the substrate and the detector,
    the material layer for reducing thermal conduction between the substrate and the detector.

14. The infrared thermal detector of claim 1, further comprising:
    a metal reflection layer on the substrate, wherein
    the metal reflection layer is below at least one of the detector and the thermal leg, and
    the metal reflection layer is configured to reduce light penetration through the substrate.

15. The infrared thermal detector of claim 1, wherein
    a width of the metal pattern is less than or equal to about $\lambda/2$ with respect to a wavelength $\lambda$ of infrared light.

16. The infrared thermal detector of claim 1, wherein the metal pattern is one of a ring shape, a disc shape, a bar shape, a rectangular shape, and a shape that is combined with a bar shape.

17. The infrared thermal detector of claim 1, wherein the thermistor material layer includes one of amorphous silicon, vanadium oxide, and nickel oxide, and
    the metal layer includes at least one of gold, aluminum, copper, and titanium.

18. The infrared thermal detector of claim 1, wherein the metal pattern is one of a bar shape, a quadrilateral shape defining at least one opening, a particle pattern, and an arrangement including polygons spaced apart.

19. The infrared thermal detector of claim 1, wherein
    the thermal leg includes a pair of structures facing each other across the detector, and
    each one of the pair of structures includes a plurality of semi-rings having a different distance from a center and a plurality of first connectors connecting plurality of semi-rings.

20. The infrared thermal detector of claim 1, further comprising:
    a filter on the detector,
    wherein the filter is configured to at least one of selectively pass incident infrared light and reduce the transmission of non-infrared light.

21. The infrared thermal detector of claim 1, wherein the detector and the substrate define an air space between the substrate and the detector.

22. The infrared thermal detector of claim 1, wherein a pixel size of the infrared thermal detector is less than or equal to about 10 μm.

23. An infrared thermal detector comprising:
a substrate;
at least one wire on the substrate;
a detector spaced apart from the substrate,
- the detector including a thermistor material layer and, a metal layer directly on the thermistor material layer or a dielectric layer and a metal layer stacked directly on the thermistor layer so the dielectric is between the metal layer and the thermistor material layer,
- the metal layer having a pattern that is configured to absorb incident infrared light via localized Plasmon resonance,
- the thermistor material layer detector configured to change a resistance value according to a temperature change caused by the absorbed infrared light; and at least one thermal leg that includes one end connected to the thermistor material layer and an other end connected to the at least one wire on the substrate.

* * * * *

UNITED STATES PATENT AND TRADEMARK OFFICE
CERTIFICATE OF CORRECTION

| | | |
|---|---|---|
| PATENT NO. | : 9,091,591 B2 | Page 1 of 2 |
| APPLICATION NO. | : 13/648474 | |
| DATED | : July 28, 2015 | |
| INVENTOR(S) | : Haeseok Park et al. | |

It is certified that error appears in the above-identified patent and that said Letters Patent is hereby corrected as shown below:

Column 15, line 6 of Claim 1

Please replace with the following:

1. An infrared thermal detector comprising:

a substrate;

a detector spaced apart from the substrate, the detector including a thermistor material layer and, a metal layer directly on the thermistor material layer, or a dielectric layer and the metal layer stacked directly on the thermistor material layer so the dielectric layer is between the metal layer and the thermistor material layer, the metal layer having a pattern that is configured to absorb incident infrared light via localized Plasmon resonance, the thermistor material layer being configured to change a resistance value according to a temperature change caused by the absorbed infrared light; and a thermal leg configured to transmit a signal from the detector to the substrate.

Column 17, lines 8 and 12 of Claim 23

Please replace with the following:

23. An infrared thermal detector comprising:

a substrate;

at least one wire on the substrate;

Signed and Sealed this
Sixteenth Day of August, 2016

Michelle K. Lee
*Director of the United States Patent and Trademark Office* a detector spaced apart from the substrate,
  the detector including a thermistor material layer and, a
  metal layer directly on the thermistor material layer, or
    a dielectric layer and a metal layer stacked directly on
    the thermistor material layer so the dielectric layer is between the
  metal layer and the thermistor material layer,
  the metal layer having a pattern that is configured to
    absorb incident infrared light via localized Plasmon
    resonance,
  the thermistor material layer configured to
    change a resistance value according to a temperature
    change caused by the absorbed infrared light; and
at least one thermal leg that includes one end connected to
  the thermistor material layer and an other end connected
  to the at least one wire on the substrate.